(12) United States Patent
Narimatsu

(10) Patent No.: US 6,712,474 B2
(45) Date of Patent: Mar. 30, 2004

(54) PROJECTION LENS AND PROJECTOR PROVIDED WITH THE SAME

(75) Inventor: Shuji Narimatsu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/235,666

(22) Filed: Sep. 6, 2002

(65) Prior Publication Data

US 2003/0058409 A1 Mar. 27, 2003

(30) Foreign Application Priority Data

Sep. 21, 2001 (JP) ........................................ 2001-289266

(51) Int. Cl.$^7$ .................. G03B 21/20; G03B 21/26; G02B 3/00; G02B 15/14
(52) U.S. Cl. .................. 353/102; 353/30; 359/676; 359/649
(58) Field of Search .................. 353/30, 102; 359/682, 359/686, 676, 649

(56) References Cited

U.S. PATENT DOCUMENTS 6,236,521 B1 * 5/2001 Nanba ........................ 359/715
6,285,509 B1 * 9/2001 Nakayama et al. .......... 359/676
6,467,912 B1 * 10/2002 Kato ............................ 353/101
6,480,340 B1 * 11/2002 Yamamoto ................... 359/676
2002/0018301 A1 * 2/2002 Narimatsu et al. ............ 353/30

* cited by examiner

Primary Examiner—Russell Adams
Assistant Examiner—Melissa J Koval
(74) Attorney, Agent, or Firm—Oliff & Berridge, PLC

(57) ABSTRACT

A projection lens includes a first lens having a negative refractive power, a second lens having a positive refractive power, a third lens having a negative refractive power and including§a first component lens having a negative refractive power and a second component lens having a positive refractive power, and a fourth lens having a positive refractive power. The first, second, third and fourth lens are arranged in that order from a screen side toward an image surface side to form a telecentric system toward the image surface side. A surface on the image surface side of the first lens, and a surface (33) on the image surface side of the second component lens of the third lens are aspherical.

13 Claims, 4 Drawing Sheets

```
                                         aa.lis
        RDY         THICKNESS         GLASS
 1:    178.19300    2.000000       1.48749  70.4
 2:     11.89100   19.718000
   ASP:
   K  :  0.000000

A  : -.475946E-04  B : -.412570E-06  C : 0.247983E-08  D : -.326762E-10

3:     21.52500    3.100000       1.78590  43.9
 4:   -587.68700   15.200000
 5:    -15.38500    2.000000       1.80518  25.5
 6:     17.19100    5.600000       1.80610  40.7
 7:    -28.15600    3.000000
   ASP:
   K  :  0.000000

A  : 0.507369E-04  B : 0.166040E-06  C : 0.221398E-09  D : -.104758E-11

8:    180.06000    6.000000       1.74330  49.2
 9:    -20.15500
10:    INFINITY    23.000000       1.51680  64.2
11:    INFINITY
```

PROJECTION LENS AND PROJECTOR PROVIDED WITH THE SAME

BACKGROUND OF THE INVENTION

1. Field of the Invention

The present invention relates to a projection lens suitable for use on a projector for projecting an image formed on a film or a slide or an image displayed by a liquid crystal display in an enlarged image on a screen, and a projector provided with the same projection lens.

2. Description of the Related Art

A projector lens for a low-cost LCD projector is required to have a large numerical aperture, to be compact and lightweight, to be capable of forming a high-definition image, to be capable of preventing distortion, to be capable of preventing chromatic aberration of magnification, to be telecentric, to have a long back focal distance, to have a short projection distance and to be inexpensive.

The projection optical system of a projector for projecting an image formed on a film or a slide or an image displayed by a liquid crystal display in an enlarged image on a screen often uses a telecentric zoom lens. However, the zoom lens is expensive and increases the cost of the projector.

A high-definition image can be formed, distortion can be reduced and chromatic aberration of magnification can be prevented by using a plurality of lenses. However, the transmittance of the projection system with light rays of short wavelengths is reduced due to internal absorption when the number of the lenses is increased. The internal absorption of light rays of short wavelength by the lenses can be reduced by forming the lenses of lead glass, which, however, increases the cost of the projection optical system.

SUMMARY OF THE INVENTION

Accordingly, it is an object of the present invention to solve problems in the prior art and to provide a projection lens consisting of a small number of lenses, having simple construction and capable of satisfactorily reducing various kinds of aberrations, and a projector provided with the same projection lens.

To achieve the object, the present invention provides a projection lens including a first lens having a negative refractive power; a second lens having a positive refractive power; a third lens having a negative refractive power and consisting of a first component lens having a negative refractive power and a second component lens having a positive refractive power; and a fourth lens having a positive refractive power; wherein the first, the second, the third and the fourth lens are arranged in that order from a screen side toward an image surface side to form a telecentric system toward the image surface side, and a surface on the image surface side of the first lens, and a surface on the image surface side of the second component lens of the third lens are aspherical.

Since the surface on the image surface side of the first lens, and the surface on the image surface side of the second component lens are aspherical surfaces, aberrations including distortion, coma and astigmatism can be reduced even though the projection lens consists of the small number of lenses.

In the projection lens according to the present invention, $0.7<|f_1/f_{2-4}|<1.0$, where $f_1$ is the focal length of the first lens, and $f_{2-4}$ is the composite focal length of the second lens, the third lens and the fourth lens, and the focal length $f_1$ and the composite focal length $f_{2-4}$ have opposite signs, respectively.

Thus, the first lens is able to gather light rays from a wide angular range, and the back focal distance is long relative to the focal length f of the projection lens.

In the projection lens according to the present invention, $0.8<f_2/f_4<1.2$, where $f_2$ is the focal length of the second lens, and $f_4$ is the focal length of the fourth lens, the radius of curvature of a surface on the screen side of the second lens is smaller than that of the other surface on the image surface side of the second lens, and the radius of curvature of a surface on the screen side of the fourth lens is greater than that of the other surface on the image surface side of the fourth lens.

Thus, aberrations caused by the second and the fourth lens compensate each other and hence a distortion that may be caused by the second and the fourth lens can be reduced.

In the projection lens according to the present invention, the aspherical surface on the image surface side of the first lens is expressed by:

$$x = \frac{Ry^2}{1 + \sqrt{1-(1+K)R^2y^2}} + Ay^4 + By^6 + Cy^8 + Dy^{10}$$

where A, B, C and D are predetermined fixed values, and R meets $0.5<R/f<1.0$, where f is the focal length of the projection lens.

Thus, the surface on the image surface side of the first lens can be formed in a shape that does not cause large aberrations including a distortion, a coma and an astigmatism.

In the projection lens according to the present invention, a surface on the image surface side of the first lens is formed in an aspherical shape by coating a spherical surface of the glass body of the first lens with a thin film of a UV-curable resin, and finishing the outer surface of the thin film in an aspherical shape.

Thus, the surface on the image surface side of the first lens can be easily formed in the aspherical shape.

A projector according to the present invention includes an image forming means for forming an image, and the projection lens according to the present invention for projecting an image formed by the image forming means.

Thus, the projector is capable of projecting an image in a high image quality.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figures 1, 2:
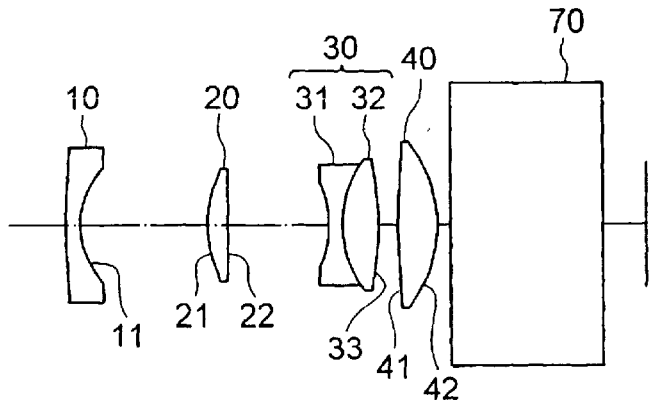
FIG. 1 is a schematic view of a projection lens in a preferred embodiment according to the present invention, in which the left side is the screen side, and the right side is the image surface side.
FIG. 2 is a table showing lens data on the projection lens shown in FIG. 1.

Referring to FIG. 1 showing a projection lens 2 in a preferred embodiment according to the present invention, the projection lens 2 comprises five lenses, namely, a first lens (single lens) 10 having a negative refractive power, a second lens (single lens) 20 having a positive refractive power, a third lens (compound lens) 30 having a negative refractive power and consisting of a first component lens (single lens) 31 having a negative refractive power and a second component lens (single lens) 32 having a positive refractive power, and a fourth lens (single lens) 40 having a positive refractive power, which are arranged in that order from the side of a screen, i.e., the left side as viewed in FIG. 1, toward the side of an image surface, i.e., the right side as viewed in FIG. 1. The projection lens 2 is substantially telecentric toward the image surface.

In FIG. 1, the right side is referred to as the image surface side instead of the object point side because an image formed on a film or a slide, or an image displayed by a liquid crystal display is disposed on the image surface side. The projection lens 2 in this embodiment is supposed to be used in a projector provided with three liquid crystal displays as image forming means. Therefore, an image-synthesizing prism 70 for synthesizing images formed by the three liquid crystal displays is disposed on the image surface side of the fourth lens 40. The three liquid crystal displays are disposed near the image surface of the projection lens 2.

Figure 5:
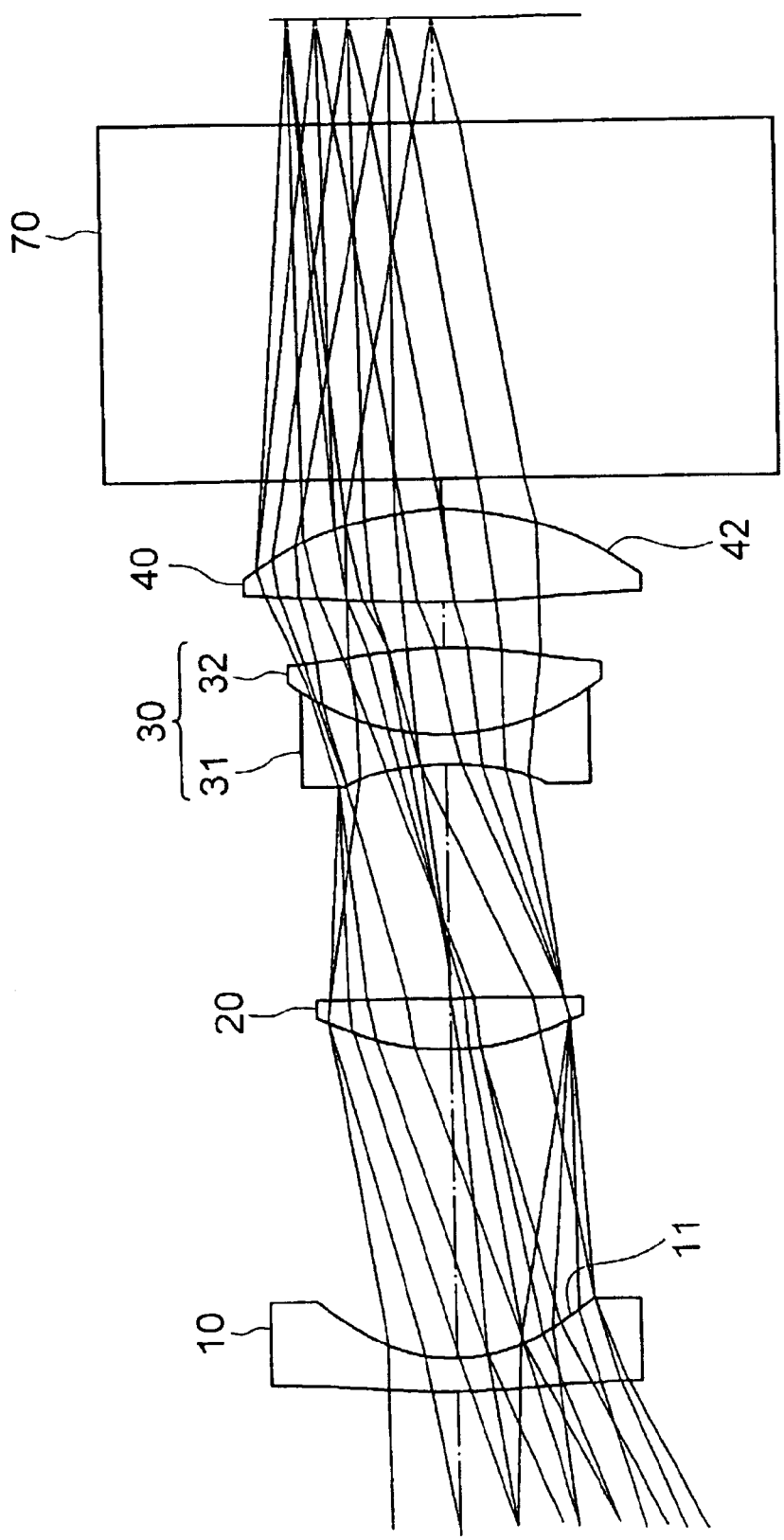
FIG. 5 is a diagrammatic view of assistance in explaining the relation between a principal ray emerging from an image surface, and an optical axis.

Referring to FIG. 5, the first lens 10 gathers light rays from a wide angular range, the second lens 20 converges light rays, the converged light rays travel through the third lens 30, the third lens 30 reduces chromatic aberration, and the fourth lens 40 converges the light rays.

The first lens 10 of the projection lens 2 has a surface 11 on the image surface side, and the second component lens 32 has a surface 33 on the image surface side. The surface 11 of the first lens 10, and the surface 33 of the second component lens 32 of the third lens 30 are aspherical. Aberrations other than chromatic aberration, such as a distortion, a coma and an astigmatism, can be greatly reduced by the aspherical surfaces 11 and 33. For example, aberrations including a distortion, a coma and an astigmatism, of 3.0% can be reduced to about 1.5%. Although the projection lens 2 consists of the relatively small number of lenses, the projection lens 2 including the first lens 10 and the second component lens 32 respectively having the aspherical surfaces 11 and 33 is capable of achieving desired reduction of aberrations.

The projection lens 2 meets a condition expressed by: $0.7 < |f_1/f_{2-4}| < 1.0$, where $f_1$ is the focal length of the first lens 10, and $f_{2-4}$ is the composite focal length of the second lens 20, the third lens 30 and the fourth lens 40, and the focal length $f_1$ and the composite focal length $f_{2-4}$ have opposite signs, respectively. The condition expressed by: $0.7 < |f_1/f_{2-4}| < 1.0$ signifies that respective magnitudes of the diverging power of the first lens 10 and the composite converging power of the second lens 20, the third lens 30 and the fourth lens 40 are substantially equal. Thus, light rays can be gathered from a wide angular range by the first lens 10, and hence the back focal distance is long relative to the focal length f of the projection lens 2 and the synthesizing prism 70 can be disposed on the image surface side. If $|f_1/f_{2-4}| \geq 1.0$, the projection lens 2 cannot have a back focal distance which is long relative to the focal length f thereof, becomes inevitably large to have a necessary back focal distance and cannot be formed in compact construction. If $|f_1/f_{2-4}| \leq 0.7$, although the projection lens 2 is able to have a necessary back focal distance, the power of the first lens 10 is excessively large and aberrations including a distortion, a coma and an astigmatism increase.

The projection lens 2 meet a condition expressed by: $0.8 < f_2/f_4 < 1.2$, where $f_2$ is the focal length of the second lens 20, and $f_4$ is the focal length of the fourth lens 40. The radius $R_{21}$ of curvature of a surface 21 on the screen side of the second lens 20 is smaller than the radius $R_{22}$ of curvature of the other surface on the image surface side of the second lens 20, and the radius $R_{41}$ of curvature of a surface 41 on the screen side of the fourth lens 40 is greater than the radius $R_{42}$ of the other surface 42 on the image surface side of the fourth lens 40. The second lens 20 and the fourth lens 40 are disposed such that the surfaces 21 and 42 respectively having the smaller radii of curvature face away from each other in opposite directions, respectively, as shown in FIG. 1, and the surfaces 22 and 42 respectively having the larger radii of curvature face toward each other.

The condition expressed by: $0.8 < f_2/f_4 < 1.2$ signifies that the respective vocal lengths $F_2$ and $f_4$ of the second lens 20 and the fourth lens 40 are substantially equal. Thus, aberrations caused by the second lens 20 and the fourth lens 40 compensate each other and hence a distortion that may be caused by the second lens 20 and the fourth lens 40 can be reduced.

The aspherical surface 11 on the image surface side of the first lens 10 is expressed by:

$$x = \frac{Ry^2}{1 + \sqrt{1 - (1+K)R^2 y^2}} + Ay^4 + By^6 + Cy^8 + Dy^{10}$$

where A, B, C and D are predetermined fixed values, and R meets a condition: $0.5 < R/f < 1.0$, where f is the focal length of the projection lens 2. The letter R represents qualitatively the radius of curvature of a central part of the aspherical surface 11 of the first lens 10. When the aspherical surface 11 meets the condition: $0.5 < R/f < 1.0$, the aspherical surface 11 prevents large aberrations including a distortion, a coma and an astigmatism. If $R/f \leq 0.5$, the radius R is excessively small and aberrations including a distortion become large. If $R/f \geq 1.0$, the radius R is excessively big, the power of the first lens 10 is small, and the projection lens 2 becomes inevitably large. When the radius R meets the condition: $0.5 < R/f < 1.0$, aberrations including a distortion can be reduced and the projection lens 2 can be formed in compact construction.

The projection lens 2 will be concretely described hereinafter.

The projection lens 2 embodying the present invention has the following construction represented by lens data shown in FIG. 2. In FIG. 2, OBJ stands for sequential surface numbers indicating lens surfaces from the screen side toward the image surface side, RDY stands for radii of curvature in millimeter, THI stands for the thicknesses of the lenses and intervals in millimeter between the adjacent lenses, and GLA stands for the D line refractive index and Abbe number of lens glass. For example, GLA 1.48749-70.4 signifies that the D line refractive index of the glass is 1.48749 and the Abbe number of the same is 70.4.

Figure 3:
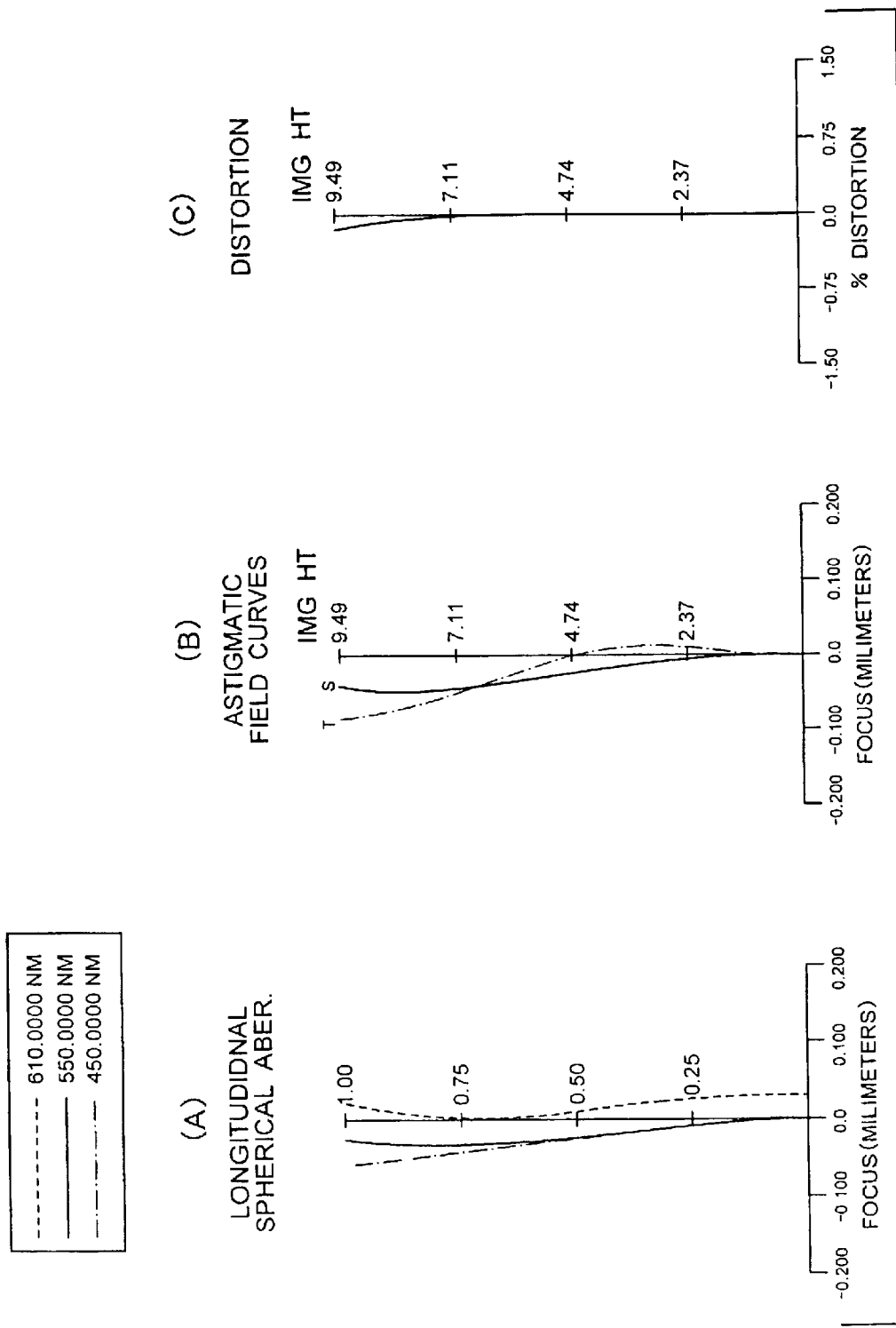
FIGS. 3(A), 3(B) and 3(C) are diagrams showing a spherical aberration, an astigmatism and a distortion caused by the projection lens shown in FIG. 1, respectively.
Figure 4:
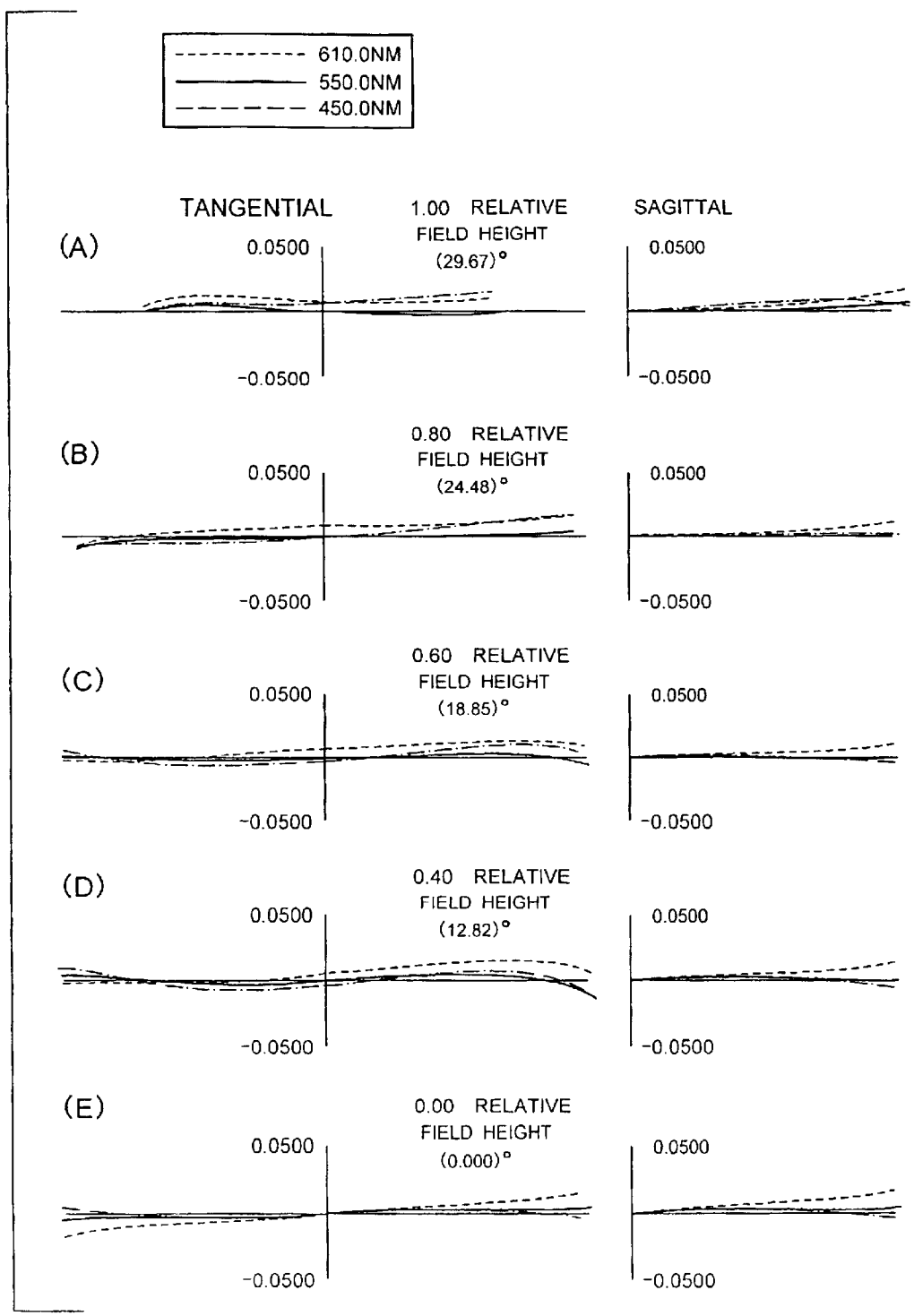
FIGS. 4(A) to 4(E) are diagrams showing transverse aberrations caused by the projection lens shown in FIG. 1 for relative field heights of 1.00, 0.80, 0.60, 0.40 and 0.00, respectively.

FIGS. 3 and 4 show aberration diagrams showing aberrations caused by the projection lens 2. FIGS. 3(A), 3(B) and 3(C) show a spherical aberration, an astigmatism and a distortion caused by the projection lens 2, respectively. FIGS. 4(A) to 4(E) show aberrations caused by the projection lens 2 for relative field heights of 1.00, 0.80, 0.60, 0.40 and 0.00, respectively.

The aspherical surface 11 of the first lens 10 is expressed by the foregoing expression. In FIG. 2, the radius of curvature (RDY) of a surface No. 2 corresponds to the coefficient R, and values of A, B, C and D for the surface No. 2 are shown.

Similarly, the aspherical surface 33 of the third lens 30 is expressed by the foregoing expression. In FIG. 2, the radius of curvature (RDY) of a surface No. 7 corresponds to the coefficient R, and values of A, B, C and D for the surface No. 7 are shown.

The projection lens 2 has the focal length f=16.62 mm, the first lens 10 has a focal length $f_1=-26.24$ mm, the second lens 20 has a focal length $f_2=26.48$, the third lens 30 has a focal length $f_3=-57.64$ mm, and the fourth lens 40 has a focal length $f_4=24.70$ mm. The composite focal length $f_{2-4}$ of the second lens 20, the third lens 30 and the fourth lens 40. Thus, $f_1/f_{2-4}=-0.828$ and the condition: $0.7<|f_1/f_{2-4}|<1.0$ is satisfied. The ratio $f_2/f_4=1.072$, which satisfies the condition: $0.8<f_2/f_4<1.2$.

When the values of the coefficients K, A, B, C and D for the surface No. 2 shown in FIG. 2 are used for defining the aspherical surface 11 on the image surface side of the first lens 10, R/f=0.715, which meets the condition: $0.5<R/f<1.0$.

Although the aspherical surface 11 on the image surface side of the first lens 10 can be formed by processing a surface of a glass body forming the first lens 10, the aspherical surface 11 can be easily formed by coating the surface of the lens body with a thin UV-curable resin film of a thickness on the order of 50 μm, and shaping the surface of the thin UV-curable resin film in an aspherical shape. The first lens 10 provided with the thin UV-curable resin film finished in the aspherical surface 11 is substantially a single lens. Therefore, the projection lens 2 is a five-element projection lens consisting of the first lens 10, the second lens 20, the third lens 30 consisting of the first component lens 31 and the second component lens 32, and the fourth lens 40. The five-element projection lens 2 has a large numerical aperture, is compact and lightweight, can be manufactured at a low cost, and is capable of properly used in an LCD projector.

Since the surface on the image surface side of the first lens 10, and the surface 33 on the image surface side of the second component lens 32 are aspherical, aberrations other than chromatic aberration, such as a distortion, a coma and an astigmatism, can be greatly reduced and a high-definition image can be formed.

The third lens 30, which is a two-element composite lens consisting of the first component lens 31 and the second component lens 32, reduces a chromatic aberration.

The projection lens 2 meeting the condition: $0.7<|f_1/f_{2-4}|<1.0$ has a long back focal distance and a short projection distance.

Although the first lens 10, the second lens 20 and the fourth lens 40 are supposed to be single lenses in the foregoing description, the term, "single lens" signifies a substantially single lens, and a lens having a surface coated with a thin film is considered to be a substantially single lens.

The projection lens can be used in a projector provided with an image-forming device for projecting an image formed by the image-forming device. The image-forming device is, for example, a liquid crystal display, an optical modulator such as a device provided with micro mirrors serving as pixels, a film or a slide. A projector provided with the projection lens embodying the present invention is capable of forming an image in a high image quality.

As apparent from the foregoing description, the projection lens according to the present invention consists of the small number of lenses, is simple in construction and is capable of satisfactorily reducing aberrations.

What is claimed is:

1. A projection lens comprising:
   a first lens having a negative refractive power;
   a second lens having a positive refractive power;
   a third lens having a negative refractive power and comprising a first component lens having a negative refractive power and second component lens having a positive refractive power; and
   a fourth lens having a positive refractive power;
   wherein the first, the second, the third and the fourth lens are arranged in that order from a screen side toward an image surface side to form a telecentric system toward the image surface side,
   a surface on the image surface side of the first lens, and a surface on the image surface side of the second component lens of the third lens are aspherical, and
   wherein $0.7<|f_1/f_{2-4}|<1.0$, where $f_1$ is a focal length of the first lens, and $f_{2-4}$ is a composite focal length of the second, the third and the fourth lens, and the focal length $f_1$ and the composite focal length $f_{2-4}$ have opposite signs, respectively.

2. A projection lens comprising:
   a first lens having a negative refractive power;
   a second lens having a positive refractive power;
   a third lens having a negative refractive power and comprising a first component lens having a negative refractive power and second component lens having a positive refractive power; and
   a fourth lens having a positive refractive power;
   wherein the first, the second, the third and the fourth lens are arranged in that order from a screen side toward an image surface side to form a telecentric system toward the image surface side,
   a surface on the image surface side of the first lens, and a surface on the image surface side of the second component lens of the third lens are aspherical; and
   wherein $0.8<f_2/f_4<1.2$, where $f_2$ is a focal length of the second lens, and $f_4$ is a focal length of the fourth lens.

3. The projection lens according to claim 1, wherein radius of curvature of a surface on the screen side of the second lens is smaller than that of the other surface on the image surface side of the second lens, and the radius of curvature of a surface on the screen side of the fourth lens is greater than that of the other surface on the image surface side of the fourth lens.

4. A projection lens comprising:
   a first lens having a negative refractive power;
   a second lens having a positive refractive power;
   a third lens having a negative refractive power and comprising a first component lens having a negative refractive power and second component lens having a positive refractive power; and
   a fourth lens having a positive refractive power;
   wherein the first, the second, the third and the fourth lens are arranged in that order from a screen side toward an image surface side to form a telecentric system toward the image surface side,
   a surface on the image surface side of the first lens, and a surface on the image surface side of the second component lens of the third lens are aspherical; and
   wherein the aspherical surface on the image surface side of the first lens is expressed by:

$$x = \frac{Ry^2}{1+\sqrt{1-(1+K)R^2y^2}} + Ay^4 + By^6 + Cy^8 + Dy^{10}$$

where A, B, C and D are predetermined fixed values, and R meets $0.5 < R/f < 1.0$, where f is the focal length of the projection lens.

5. The projection lens according to claim 1, wherein the first lens has a focal length $f_1=-26$ mm, the second, the third and the fourth lens have a composite focal length $f_{2-4}=32$ mm, and $f_1/f_{2-4}=0.8$.

6. The projection lens according to claim 2, wherein the second lens has a focal length $f_2=27$ mm, the fourth lens has a focal length $f_4=25$ mm, and $f_2/f_4=1.1$.

7. A projector comprising:
an image forming means for forming an image, and
the projection lens according to claim 1 for projecting an image formed by the image forming means.

8. A projector comprising:
an image forming means for forming an image, and
the projection lens according to claim 2 for projecting an image formed by the image forming means.

9. A projector comprising:
an image forming means for forming an image, and
the projection lens according to claim 4 for projecting an image formed by the image forming means.

10. A projector comprising:
an image forming means for forming an image, and
the projection lens according to claim 5 for projecting an image formed by the image forming means.

11. A projector comprising:
an image forming means for forming an image, and
the projection lens according to claim 6 for projecting an image formed by the image forming means.

12. The projection lens according to claim 2 wherein radius of curvature of a surface on the screen side of the second lens is smaller than that of the other surface on the image surface side of the second lens, and the radius of curvature of a surface on the screen side of the fourth lens is greater than that of the other surface on the image surface side of the fourth lens.

13. The projection lens according to claim 4 wherein radius of curvature of a surface on the screen side of the second lens is smaller than that of the other surface on the image surface side of the second lens, and the radius of curvature of a surface on the screen side of the fourth lens is greater than that of the other surface on the image surface side of the fourth lens.

* * * * *